US007550520B2

(12) United States Patent
Daly et al.

(10) Patent No.: US 7,550,520 B2
(45) Date of Patent: Jun. 23, 2009

(54) METHOD OF PREPARING HIGH ORIENTATION NANOPARTICLE-CONTAINING SHEETS OR FILMS USING IONIC LIQUIDS, AND THE SHEETS OR FILMS PRODUCED THEREBY

(75) Inventors: Dan Daly, Tuscaloosa, AL (US); Robin Rogers, Tuscaloosa, AL (US)

(73) Assignee: The University of Alabama, Tuscaloosa, AL (US)

( * ) Notice: Subject to any disclaimer, the term of this patent is extended or adjusted under 35 U.S.C. 154(b) by 655 days.

(21) Appl. No.: 11/139,690

(22) Filed: May 31, 2005

(65) Prior Publication Data

US 2006/0269695 A1    Nov. 30, 2006

(51) Int. Cl.
*C08J 3/28* (2006.01)

(52) U.S. Cl. .................. 523/300; 524/431; 524/435; 524/440

(58) Field of Classification Search .................. 523/300; 524/431, 435, 440
See application file for complete search history.

(56) References Cited

U.S. PATENT DOCUMENTS

| 1,943,176 | A | 1/1934 | Graenacher | 260/100 |
|---|---|---|---|---|
| 4,188,263 | A | 2/1980 | Hulsmann et al. | 435/179 |
| 4,970,156 | A | 11/1990 | Avrameas et al. | |
| 5,679,146 | A | 10/1997 | Kalt et al. | 106/166.01 |
| 5,683,832 | A | 11/1997 | Bonhote et al. | 429/111 |
| 5,714,536 | A | 2/1998 | Ziolo et al. | 524/430 |
| 5,757,125 | A | 5/1998 | Markulin | 428/34.8 |
| 5,792,399 | A | 8/1998 | Meister et al. | 264/101 |
| 5,827,602 | A | 10/1998 | Koch et al. | 429/194 |
| 6,376,712 | B2 | 4/2002 | Narizuka et al. | 564/385 |
| 6,451,220 | B1 | 9/2002 | Ziolo et al. | 252/62.54 |
| 6,613,310 | B1 | 9/2003 | Campbell et al. | 424/54 |
| 6,808,557 | B2 | 10/2004 | Holbrey et al. | 106/163.01 |
| 6,824,599 | B2 | 11/2004 | Swatloski et al. | 106/163.01 |
| 2002/0010291 | A1 | 1/2002 | Murphy | 526/133 |
| 2003/0059604 | A1 | 3/2003 | Hattori et al. | 428/329 |
| 2003/0165445 | A1 | 9/2003 | Malnou et al. | 424/61 |
| 2003/0233742 | A1 | 12/2003 | Jones et al. | 28/118 |
| 2004/0020327 | A1* | 2/2004 | Hattori et al. | 75/348 |
| 2004/0038031 | A1 | 2/2004 | Holbrey et al. | |
| 2005/0123851 | A1 | 6/2005 | Shinbori et al. | 430/270.1 |
| 2005/0194561 | A1 | 9/2005 | Davis et al. | |
| 2005/0285073 | A1 | 12/2005 | Singh et al. | 252/62.54 |
| 2006/0194197 | A1 | 8/2006 | Spangler et al. | 435/5 |

FOREIGN PATENT DOCUMENTS

| CA | 2479941 | 10/2003 |
|---|---|---|
| CH | 153446 | 6/1932 |
| CN | 1380110 | 4/2002 |
| DE | 93-4308410 | 3/1993 |
| JP | 86-199569 | 8/1986 |
| JP | 2003335887 | 5/2002 |
| JP | 2002290011 | 10/2002 |
| JP | 2003171144 | 6/2003 |
| WO | WO 95/21871 | 8/1995 |
| WO | WO 96/06593 | 3/1996 |
| WO | WO 00/32658 | 6/2000 |
| WO | WO 01/81436 | 11/2001 |
| WO | WO 02/079269 | 10/2002 |
| WO | WO 03/041692 | 11/2002 |
| WO | WO 02/100360 | 12/2002 |
| WO | WO 02/102586 | 12/2002 |
| WO | WO 03/029329 | 4/2003 |
| WO | WO 03/074031 | 9/2003 |

OTHER PUBLICATIONS

Al-Adhami et al., "Immobilization of Modified Cellulose and Acrylic on Wood-Rotting Fungi Swelling Carriers," *J Process Biochemistry*, 37:1387-94, 2002.
Ast et al., "Efficient Assembly of Peptomers on Continuous Surfaces," *Tetrahedron Lett*, 40:4317, 1999.
BlankeMeyer-Menge et al., "Simultaneous Multiple Synthesis of Protected Peptide Fragments on Allyl-Functionalized Cellulose Disc Supports," *Tetrahedron Lett*, 29:5871, 1988.
Bora et al., A Simple Method For Functionalization of Cellulose Membrane for Covalent Immobilization of Biomolecules, *J Membr Sci*, 250:215-22, 2005.
Chesney et al., "Amino-Derivatised Beaded Cellulose Gels. Novel Accessible and Biodegradable Scavenger Resins for Solution Phase Combinatorial Synthesis," *Green Chem*, 2:57-62, 2000.
Froehner and Eriksson, "Properties of the Glycoprotein Laccase Imobilised By Two Methods," *Acta Chem Scand B*, 29:691, 1975.
Gelbrich, "Colloidal Structures Based On Topochemically Modified Cellulose," *Papier* (Heidelberg), 52:755, 1998 (German/Untranslated into English).
Gemeiner, In Enzyme Engineering, Gemeiner, Ed., Ellis Horwood Series in *Biochemistry and Biotechnology*, Ellis Horwood Limitied: West Sussex, England, pp. 158-179, 1992.
Harkin and Obst, "Lignification In Trees: Indication of Exclusive Peroxidase Participation," *Science*, 180:296-98, 1973.
Hirayama, "Rapid Confirmation and Revision of the Primary Structure of Bovine Serum Albumin by ESIMS and Frit-FAB LC/MS," *Biochem Biophys Comm*, 173:639-646, 1990.

(Continued)

*Primary Examiner*—Edward J Cain
(74) *Attorney, Agent, or Firm*—Ballard Spahr Andrews & Ingersoll, LLP

(57) ABSTRACT

A method is provided for the preparation of nanomaterials, which involves the dissolution and/or suspension of a combination of (a) one or more resin substrate materials and (b) one or more magnetic nanoparticulate substances, in a medium made from one or more ionic liquids, to provide a mixture, and recovering the solid nanomaterial by combining the mixture with a non-solvent (solvent for the ionic liquids but not the other components), while also applying an electromagnetic field to the mixture during the recovering step to align the magnetic nanoparticulate substances, along with the use of the resulting nanomaterials to provide unique information storage media, particularly in the form of sheets or films.

11 Claims, No Drawings

OTHER PUBLICATIONS

Illanes et al., "Immobilization of Lactase and Invertase on Crosslinked Chitin," In Bioreactor Immobilized Enzymes and Cells, Moo-Young, Ed., *Elsevier Applied Science*: London, 233-49, 1998.
Illanes, "Stability of Biocatalysts," *Elec J Biotechnol*, 2(1):1-9, 1999.
International Search Report for PCT/US06/24863 filed Jun. 27, 2006.
Krajewska, "Application of Chitin- and Chitosan-based Materials For Enzyme Immobilizations: A Review," *Enz Microb Technol*, 35:126-39, 2004.
Lau et al., "Dissolution of *Candida antarctica* Lipase B In Ionic Liquids: Effects on Structure and Activity," *Green Chem*, 6:483-87, 2004.
Liebert and Heinze, "Tailored Cellulose Esters: Synthesis and Structure Determination," *Biomacromolecules*, 6:333-40, 2005.
Mais et al., "Modification of Cellulose Using Cellulose P-Toluenesulfonates as Intermediates," *Zeszyty Naukowe Politechniki Slaskiej Chemm*, 140:121-1999.
Sakai, "Determination of Pore Size and Pore Size Distribution," *J Membr Sci*, 96:91-130, 1994.
Stöllner et al., "Activation of Cellulose Membranes With 1,1'-Carbonyldiimidazole or 1-Cyano-4-Dimethylaminopyridinium Tetrafluoroborate as a Basis for the Development of Immunosensors," *Anal Biochem*, 304:157-65, 2001.
Tiller et al., "A Novel Efficient Enzyme-Immobilization Reaction on $NH_2$ Polymers By Means of L-Ascorbic Acid," *Biotechnol Appl Biochem*, 30:155-62, 1999.
Turner et al., "Production of Bioactive Cellulose Films Reconstituted from Ionic Liquids," *Biomacromolecules*, 5:1379-84, 2004.
Written Opinion of PCT/US05/010235 filed on Jan. 3, 2007.
Benton et al., "Effect of Room-Temperature Ionic Liquids as Replacements for Volatile Organic Solvents in Free-Radical Polymerization," *Amer. Chem. Soc.*, Chapter 10, 125-133 (2002).
Biedron et al., "Ionic Liquids as Reaction Media for Polymerization Processes: Atom Transfer Radical Polymerization (ATRP) of Acrylates in Ionic Liquids," *Polymer International*, 52(10):1584-1588 (2003).
Bonhôte et al., "Hydrophobic, Highly Conductive Ambient-Temperature Molten Salts," *Inorg. Chem.*, 35:1168-1178 (1996).
Endres, "Ionic Liquids: Solvents for the Electrodeposition of Metals and Semiconductors," *ChemPhysChem*, 3:144-154 (2002).
Fannin et al., "Properties of 1,3-Dialkylimidazolium Chloride-Aluminum Chloride Ionic Liquids. 2. Phase Transitions, Densities, Electrical Conductivities, and Viscosities," *J. Phys. Chem.*, 88:2614-2621 (1984).
Fischer et al., "Structural Changes of Cellulose Dissolved in Molten Salt Hydrates," *Book of Abstracts, 219th ACS National Meeting*, San Francisco, CA, Mar. 26-30, 2000 (Abstract).
Gordon et al., "Fused Organic Salts. 8. Properties of Molten Straight-Chain Isomers of Tetra-*n*-pentylammonium Salts," *J. Amer. Chem. Soc.*, 100(24):7445-7454 (1978).
Heinze et al., "Unconventional Methods in Cellulose Functionalization," *Progress in Polymer Science*, 26:1689-1762 (2001).
Holbrey et al., "The Phase Behaviour of 1-Alkyl-3-Methlimidazolium Tetrafluoroborates; Ionic Liquids and Ionic Liquid Crystals," *J. Chem. Soc., Dalton Trans.*, 2133-2139 (1999).
Huddleston et al., "Characterization and Comparison of Hydrophilic and Hydrophobic Room Temperature Ionic Liquids Incorporating the Imidazolium Cation," *Green Chem.* 3:156-164 (2001).
Husemann et al., "Homogeneous Acetylation of Cellulose," *Buletinul Institutului Politehnic din Iasi*, 16(1):47-51 (Abstract Only).
Kirk-Othmer, "Cellulose," *Encyclopedia of Chemical Technology*, 5:476-563 (1993).

Leipner et al., "Structural Changes of Cellulose Dissolved in Molten Salt Hydrates," *Macromol. Chem. Phys.*, 201(15):2041-2049 (2000).
Linko et al., "Cellulose Bead Entrapped Microbial Cells for Biotechnical Applications," *Enzyme Microb. Technol.*, 1:26-30 (1979).
Ma et al., "Reverse Atom Transfer Radical Polymerization of Methyl Methacrylate in Room-Temperature Ionic Liquids," *J. Polymer Sci. Pt. A-Polymer Chem.*, 41:143-151 (2003).
Maia et al., "Cellulose Organic Solvents. I. The Structures of Anhydrous *N*-Methylmorpholine *N*-Oxide and *N*-Methylmorpholine *N*-Oxide Monohydrate," *Acta Cryst.*, B37:1858-1862 (1981).
Marson et al., "A Novel, Efficient Procedure for Acylation of Cellulose Under Homogeneous Solution Conditions," *J. Appl. Polymer Sci.*, 74:1355-1360 (1999).
Martin et al., "Anisotropic magnetism in field-structured composites," *Phys. Rev. E.*, 61(3), 2818-2830 (2000).
Mazurkiewicz et al., "Conducting Polymer Electrochemistry in Ionic Liquids," *Synthetic Metals*, 135:31-32 (2003).
Nara et al., "Compositions Consisting of Cationic Polymers Comprising Amidinium Groups and Ionic Liquids," *Tetrahedron Lett.*, 44:1371-1373 (2003).
Ngo et al., "Thermal Properties of Imidazolium Ionic Liquids," *Thermochimica Acta.*, 357-358:97-102 (2000).
Ohno et al., "A New Type of Polymer Gel Electrolyte: Zwitterionic Liquid/Polar Polymer Mixture," *Electrochimica Acta.*, 48(14-16):2079-2083 (2003).
Okamoto et al., "Synthesis, Spectra, and Reactions of N-Triphenylmethylpyridinium Salts. Reactions of Triphenylmethyl Chloride with Pyridine Under High Pressure," *J. Org. Chem.*, 35(11):3752-3756 (1970).
Perrier et al., "Reversible Addition-Fragmentation Chain Transfer Polymerization of Methacrylate, Acrylate and Styrene Monomers in 1-Alkyl-3-Methylimidazolium Hexfluorophosphate," *European Polymer J.*, 39(3):417-422 (2003).
Ren et al., "Synthesis of 1-Allyl-3-Methylimidazolium-Based Room Temperature Ionic Liquid and Preluviinary Study of its Dissolving Cellulose," *Acta Polymerica Sinica*, 448-451 (2003) (in Chinese).
Shriver et al., "Inorganic Chemistry," W. H. Freeman, NY, 406-407 (1990).
Snedden et al., "Cross-Linked Polymer-Ionic Liquid Composite Materials," *Macromolecules*, 36(12):4549-4556 (2003).
Suarez et al., "Synthesis and Physical-Chemical Properties of Ionic Liquids Based on 1-*n*-Butyl-3-Methylimidazolium Cation," *J. Chim. Phys.*, 95:1626-1639 (1998).
Swatloski et al., "Dissolution of Cellulose with Ionic Liquids," *J. Am. Chem. Soc.*, 124:4974-4975 (2002).
Swatloski et al., "Ionic Liquids for the Dissolution and Regeneration of Cellulose," In *Molten Salts XIII, Proceedings of the thirteenth international symposium on molten salts*, De Long et al., eds., 155-165 (2002).
Weckstrom et al., "Food Engineering in Food Processing," *Applied Science Publishers Ltd.*, 2:148-151 (1979).
Wilkes et al., "Air and Water Stable 1-Ethyl-3-methylimidazolium Based Ionic Liquids," *J. Chem. Soc., Chem Commun.*, 965-967 (1992).
Wu et al., "Homogeneous Acetylation of Cellulose in a New Ionic Liquid," *Biomacromol.*, 5:266-268 (2004).
International Search Report and Written Opinion for PCT/US2006/020941 filed May 30, 2006.
Ren et al., "Synthesis of 1-Allyl-3-Methylimidazolium-Based Room Temperature Ionic Liquid and Preliminary Study of its Dissolving Cellulose," Acta Polymerica Sinica, 448-51, 2003 (Abstract).

* cited by examiner

METHOD OF PREPARING HIGH ORIENTATION NANOPARTICLE-CONTAINING SHEETS OR FILMS USING IONIC LIQUIDS, AND THE SHEETS OR FILMS PRODUCED THEREBY

BACKGROUND OF THE INVENTION

1. Field of Invention

The present invention relates to the use of ionic liquids as a medium for preparing sheets or films of a resin material containing Nanoparticles, wherein the Nanoparticles are highly oriented within the sheet or film.

2. Discussion of the Background

The production of nanomaterials requires energy intensive processes. Particular difficulty has been met when attempting to capture Nanoparticles and prevent their agglomeration, then align these Nanoparticles to produce an orderly array. This can often be attributed to the importance in the nanoscale world of Brownian motion and surface forces. These forces can be significant factors causing agglomeration, such as when strong surface forces make the moving parts of a NEMS device stick together and seize up. (Jones, Journal of Nanotechnology, August 2004).

A particularly desired oriented nanomaterial is a sheet or film made from a resin material, such as cellulose, in which aligned nanoscale magnetic particles are embedded. Such materials can be used as smart paper, and in magnetic information storage media. While it is well established that the storage capacity of recording media can be significantly increased by further reducing the grain size and distribution of magnetic particles in the thin film in order to increase the signal-to-noise ratio of the medium, upon reaching the nanoscale for the magnetic particles, it becomes increasingly difficult to adequately distribute the particles and avoid agglomeration. Further, it is necessary to increase the magnetic anisotropy of the resulting product in order to guarantee thermal stability of the recorded information.

Ionic liquids are now a well-established class of liquids containing solely ionized species, and having melting points largely below 150° C., or most preferably below 100° C. In most cases, ionic liquids (ILs) are organic salts containing one or more cations that are typically ammonium, imidazolium or pyridinium ions, although many other types are known.

Endres, *Chem Phys Chem*, 2002, 3, 144-154, discloses the electrodeposition of various materials, such as metals, onto substrates from ionic liquids.

Martin et al, *Phys. Rev. E,* 61(3), 2818-2830 (2000) disclose the production of magnetic field-structured composites (FSCs) by structuring magnetic particle suspensions in uniaxial or biaxial, e.g., rotating, magnetic fields, while polymerizing the suspending resin. However, since the suspensions are produced by polymerizing the resin in which the magnetic particles are suspended, the disclosed process can only be used with systems in which the suspending resin is prepared during the process.

When a magnetic particle suspension, containing multidomain particles, is exposed to a uniaxial magnetic field, the magnetic dipole moment on the particles will generally increase and align with the applied field. The particles will then migrate under the influence of the dipolar interactions with neighboring particles, to form complex chainlike structures. If a magnetic particle suspension is instead exposed to a biaxial (rotating) magnetic field, the induced dipole moments produce a net attractive interaction in the plane of the field, resulting in formation of a complex sheetlike structure. Similar effects occur when suspensions of dielectric particles are subjected to uniaxial or biaxial electric fields. These materials are known in the art as field-structured composites (FSCs). FSCs can have large anisotropies in properties such as conductivity, permittivity, dielectric breakdown strength, optical transmittance, etc. (Martin et al, ibid.)

There is thus a need for a method to reliably produce nanomaterials having aligned Nanoparticles contained in the material matrix, while also providing high magnetic anisotropy of the resulting material.

SUMMARY OF THE INVENTION

Accordingly, one object of the present invention is to provide a method for producing nanomaterials, particularly in the form of sheets or films, which have Nanoparticles uniformly distributed and embedded therein.

A further object of the present invention is to provide a method for producing nanomaterials having high magnetic anisotropy, permitting their use in thermally stable information storage media.

A further object of the present invention is to provide a thermally stable information storage medium having high signal-to-noise ratio and high magnetic anisotropy.

These and other objects of the present invention, either individually or in combinations thereof, have been satisfied by the discovery of a process, comprising dissolving and/or suspending one or more resin substrate materials and one or more magnetic nanoparticulate substances in a medium comprising one or more ionic liquids to provide a mixture, and recovering a solid nanomaterial comprising the one or more resin substrate materials having the one or more magnetic nanoparticulate substances distributed therein by combining the mixture with a substance miscible with said one or more ionic liquids, but immiscible with said one or more resin substrate materials and said one or more nanoparticulate substances, wherein during said recovery step, an electromagnetic field is applied to the mixture to align said one or more nanoparticulate substances within said one or more resin substrate materials;

and the nanomaterials produced thereby, along with their use in providing information storage media such as smart paper and magnetic recording tape.

DETAILED DESCRIPTION OF THE INVENTION

The term "nanomaterials" as used herein refers to compositions which contain one or more nanoparticulate substances along with a resin substrate material. The term "resin substrate material(s)" as used herein, includes one or more polymers, one or more copolymers and combinations thereof. The term "blend" as used herein, includes two or more polymers, two or more copolymers and combinations thereof, immiscible or miscible at the molecular level or domain level. The term "polymeric materials" includes one or more polymers, copolymers and mixtures thereof. The term "non-solvent" as used herein refers to a substance miscible with the one or more ionic liquids, but immiscible with the one or more resin substrate materials and the one or more nanoparticulate substances.

The present invention provides a process for the production of nanomaterials in which the Nanoparticles are aligned and substantially uniformly distributed within the resin substrate material. The process comprises dissolving and/or suspending one or more resin substrate materials and one or more magnetic nanoparticulate substances in a medium comprising one or more ionic liquids to provide a mixture, and recovering a solid nanomaterial comprising the one or more resin substrate materials having the one or more magnetic nanoparticulate substances distributed therein by combining the mixture with a non-solvent, wherein during the recovery step, an electromagnetic field is applied to the mixture to align the one or more nanoparticulate substances within the one or more resin substrate materials.

The unique solvation properties of ionic liquids allow for the dissolution of a wide range of resin substrate materials, particularly materials useful in the production of magnetic information storage media, such as polyesters and cellulose materials. Further, these unique solvation properties also allow the ionic liquid to dissolve a wide range of magnetic nanoparticulate substances. This dual dissolution ability permits intimate mixing of the resin substrate materials and the magnetic nanoparticulate substances, which, upon adding the mixture to a "non-solvent" in turn, allows for the creation of nanomaterials, most preferably in the form of sheets or films, wherein the magnetic nanoparticulate substances are distributed throughout the resin substrate material and are aligned due to the presence of the electromagnetic field during the reconstitution step during which the Nanoparticles are still mobile and alignable. The resulting nanomaterials can be in any desired form, but are preferably in the form of sheets or films, suitable for the creation of information storage media, due to the high anisotropy and alignment of the Nanoparticles within the resin substrate material. These information storage media can be recorded using any conventional recording force used for the particular type of recording medium, such as electrical, magnetic, light, heat, etc. Preferred information storage media include, but are not limited to materials known as "smart paper" (also known in the art as e-ink, reusable sign media or e-paper; such as the electronic-display technology based on full-color programmable media produced by Mag-ink, from Neveh-Ilan, Israel) and in magnetic storage tapes or disks.

Suitable non-solvents include, but are not limited to, polar liquid systems, such as water, alcohols and other hydric liquids. In a preferred embodiment, the ionic liquid is removed by the addition of water.

The magnetic field used can be uniaxial, biaxial or triaxial, depending on the type of orientation of the Nanoparticles desired, and is applied to the resin substrate material containing nanoparticles in accordance with methods well known in the art. The magnetic field used to align the nanoparticulate materials can have any desired field strength, but is preferably in a range of 10 to 1000 Gauss, more preferably from 50 to 350 Gauss.

The process of the present invention can use polymers that contain various repeating monomeric units, as the resin substrate material. These monomer units may contain polar, non-ionic, and charged groups, including, but not limited to, $-NH_2-$, $-NHR$, $-NR_2$, $-N^+R_3X^-$, $-O-$, $-OH$, $-COOH$, $-COO^-M^+$, $-SH$, $-SO_3^-M^+$, $-PO_3^{2-}M^{2+}$, $-PR_3$, $-NH-CO-NH_2$ and $-NHC(NH)NH_2$. These groups may be present in sufficient numbers along, or pendent to, the polymeric backbone, in polymers, such as, polyacrylamide, polyvinyl alcohol, polyvinyl acetate, polyamides, polyesters, polyimideamides, polybenzoimide, aramides, polyimides, poly(N-vinylpyrrolidinone) and poly (hydroxyethyl acrylate). These groups also impact the solubility of the respective polymer. The polymer can have a complex structure due to intramolecular hydrogen bonding, ionic interactions, intermolecular interactions, and chain-chain complexation. These interactions govern the solution properties and performance. Solvent properties such as polarity, charge, hydrogen bonding, interactions between the polymer and the solvent are also important in effective dissolution and blending.

Three abundant polysaccharides, cellulose, starch, and chitin do not dissolve in most common solvents directly, due to their unique molecular and supermolecular structure. One way to enhance a polymer's dissolution is to chemically modify it, for example, by adding one or more hydroxyethyl, hydroxypropyl, methyl, carboxymethyl, sulfate, or phosphate groups to the polymer structure. These modifications alter the polymer's aforementioned interactions, thereby, increasing its solubility in common organic solvents and in many cases water. Instead of chemically altering the polymer, the present invention provides a method of processing the virgin polymer using ionic liquids as the solvent, thus lessening chemical usage and processing steps, and making the overall process more environmentally and economically sustainable. The use of cellulose in particular, is useful in the production of smart papers, which can store information and can be reused upon re-recording of the information on the paper.

Ionic Liquids ("ILs") have a more complex solvent behavior compared with traditional aqueous and organic solvent, because ILs are salts and not a molecular, nonionic solvent. Types of interactions between ILs with many solutes, include dispersion, $\pi$-$\pi$, n-$\pi$, hydrogen bonding, dipolar and ionic/charge-charge. The Abraham solvation equation is an important method used to characterize ILs solvent property to understand the polymer dissolution behavior in ILs. Some typical $C_4$mim ILs interaction parameters are shown in Table 1 below. ILs that have strong dipolarity, hydrogen bond accepting (A) ability, and hydrogen bond donating (B) ability are compared with other solvents that are capable of dissolving cellulose (see table below). $C_4$mimCl, one of the most unique solvents, shows the largest A (a=4.860) and a strong ability to interact with solute molecules via non-bonding or $\pi$-electron interaction (r=0.408). The cation $C_4$mim, in combination with the anion $Cl^-$, exhibits significant ability to interact with $\pi$-systems of solute molecules (Anderson, J. L. et. al). The smaller Gibbs free energies of hydration of $Cl^-$ ($\Delta G_{hyd}$=-347 kJ/mol) shows a larger HBA 4.860, compared to that of 1.660 of $[BF_4^-]$ ($\Delta G_{hyd}$=-200 kJ/mol).

TABLE 1

| Ionic liquid | R | S | A | B | l |
|---|---|---|---|---|---|
| $C_4$mim Cl | 0.408 | 1.826 | 4.860 | −0.121 | 0.392 |
| $C_4$mim $BF_4$ | −0.141 | 1.365 | 1.660 | −0.283 | 0.473 |
| $C_4$mim $PF_6$ | 0 | 1.540 | 1.369 | 0 | 0.439 |
| Dimethylacetamide | .36 | 1.33 | 0 | .78 | .787 |
| Dimethylformamide | .37 | 1.31 | 0 | .74 | .6468 |
| Dimethylsulfoxide | .52 | 1.74 | 0 | .88 | .776 |

R is the excess molecular refraction,
l is the molecular volume
A is the hydrogen bond acidity parameter
B is the hydrogen bond basicity parameter
S is the polarity/polarisability parameter The present invention process provides the mixing of one or more resin substrate materials (polymers and/or copolymers) and one or more magnetic nanoparticulate substances with one or more ionic liquids. Mixing can be accomplished by any conventional procedure in the art, including, but not limited to, various stirring mechanisms, agitation mechanisms, sonication and vortexing. In a preferred embodiment, the mixture is heated to about 100° C. The addition of heat may be supplied by any conventional and non-conventional heat source, including, but not limited to, a microwave source. It has been found that microwave radiation not only provides heat, but also facilitates the dissolution of polymeric materials in the ionic solvent. It is speculated that the facilitated dissolution may be due to the absorption and resulting increase molecular motions of solute and solvent.

In a preferred embodiment wherein the resin substrate material is cellulose, ionic liquids allow for the dissolution of cellulose without derivatization, in high concentration. Such a solution may be heated to about 100° C., or to about 80° C., in an ultrasonic bath. This heating can be effectively accomplished by using microwave radiation supplied by a domestic microwave oven. In one preferred embodiment of the invention, an admixture of hydrophilic ionic liquid and cellulose is heated to a temperature of about 100 to about 150° C., using microwave radiation.

Resin Substrate Materials

Suitable resin substrate materials for use in the process of the present invention include, but are not limited to, polymers and copolymers formed by step, chain, ionic, ring-opening and catalyzed polymerizations.

Suitable polymers and copolymers can be derived from natural and synthetic sources, including, but are not limited to, polysaccharides, polyester, polyamide, polyurethane, polysiloxane, phenol polymers, polysulfide, polyacetal, polyolefins, acrylates, methacrylates and dienes. In particular, preferred polymers include, but are not limited to, cellulose, hemicellulose, starch, chitin, silk, wool, poly-2-hydroxymethylmethacrylate, poly-2-hydroxyethylmethacrylate, polyamides, polyesters, polyimideamides, polybenzoimide, aramides, polyimides, polyvinyl alcohol, polyaniline, polyethylene glycol, polyacrylonitrile, polystyrene, polyethylene oxide with terminal amine groups, linear polyethyleneimine, and branched polyethyleneimine.

Monomers include, but are not limited to, α-olefins, 2-hydroxyalkylmethacrylate, aniline, acrylonitrile, ethylene, isobutylene, styrene, vinyl chloride, vinyl acetate, vinyl alcohol, methyl methacrylate, ethylene glycol, cellobiose, vinylidene chloride, tetrafluoroethylene, formaldehyde, acetaldehyde, vinylpyrrolidinone, butadiene and isoprene.

Magnetic Nanoparticulate Substances

The magnetic nanoparticulate substances of the present invention can be any magnetic material having nanoscale dimensions that is susceptible of alignment or orientation in the presence of an electromagnetic field. Suitable magnetic nanoparticulate substances include, but are not limited to, iron, cobalt, nickel, oxides thereof and mixtures/alloys thereof. More preferably, the magnetic nanoparticulate substances include one or more of cobalt particles, iron-cobalt particles, iron oxide particles, nickel particles and mixtures thereof.

Ionic Liquids

The ionic liquids comprise one or more cations and one or more anions. In a preferred embodiment of the invention, a mixture of cations and anions is selected and optimized for the dissolution of a particular combination of one or more resin substrate materials and one or more magnetic nanoparticulate materials.

In one embodiment, the cation is preferably derived from an organic compound, including, but not limited to, the following heterocyclics: imidazoles, pyrazoles, thiazoles, isothiazoles, azathiozoles, oxothiazoles, oxazines, oxazolines, oxazaboroles, dithiozoles, triazoles, selenozoles, oxaphospholes, pyrroles, boroles, furans, thiophens, phospholes, pentazoles, indoles, indolines, oxazoles, isoxazoles, isotriazoles, tetrazoles, benzofurans, dibenzofurans, benzothiophens, dibenzothiophens, thiadiazoles, pyridines, pyrimidines, pyrazines, pyridazines, piperazines, piperidines, morpholones, pyrans, annolines, phthalazines, quinazolines and quinoxalines, quinolines, pyrrolidines, isoquinolines, and combinations thereof.

The anionic portion of the ionic liquid preferably comprises at least one of the following groups: halogens, $BX_4^-$, $PF_6^-$, $AsF_6^-$, $SbF_6^-$, $NO_2^-$, $NO_3^-$, $SO_4^{2-}$, $BR_4^-$, substituted or unsubstituted carboranes, substituted or unsubstituted metallocarboranes, phosphates, phosphites, polyoxometallates, substituted or unsubstituted carboxylates, triflates and non-coordinating anions; and wherein R is at least one member selected from the group consisting of hydrogen, alkyl, substituted alkyl, cycloalkyl, substituted cycloalkyl, heteroalkyl, heterocycloalkyl, substituted heterocycloalkyl, aryl, substituted aryl, heteroaryl, substituted heteroaryl, alkoxy, aryloxy, acyl, silyl, boryl, phosphino, amino, thio, seleno, and combinations thereof.

In a preferred embodiment, cations that contain a single five-membered ring free of fusion to other ring structures, such as an imidazolium cation are particularly preferred, and the anion of the ionic liquid is preferably a halogen or pseudohalogen. For example, a 1,3-di-($C_1$-$C_6$ alkyl or $C_1$-$C_6$ alkoxyalkyl)-substituted-imidazolium ion is a particularly preferred cation. The corresponding anion can preferably be a halogen or pseudohalogen. In addition, a 1-($C_1$-$C_6$ alkyl)-3-(methyl)-imidazolium [$C_n$mim, where n=1-6] cation is also preferred, and a halogen is a preferred anion.

A preferred ionic liquid is one that is liquid at or below a temperature of about 200° C., and preferably below a temperature of about 150° C., and above a temperature of about −100° C. For example, N-alkylisoquinolinium and N-alkylquinolinium halide salts have melting points of less than about 200° C. The melting point of N-methylisoquinolinium chloride is about 183° C., and N-ethylquinolinium iodide has a melting point of about 158° C. More preferably, a contemplated ionic liquid is liquid (molten) at or below a temperature of about 120° C., and above a temperature of minus 44° C. (−44° C.). Most preferably, a contemplated ionic liquid is liquid (molten) at a temperature of about −10 to about 100° C.

Further examples of ionic liquids include, but are not limited to, [$C_2$mim]Cl, [$C_3$mim]Cl, [$C_4$mim]Cl, [$C_6$mim]Cl, [$C_8$mim]Cl, [$C_2$mim]I, [$C_4$mim]I, [$C_4$mim][$PF_6$], [$C_2$mim][$PF_6$], [$C_3$mim][$PF_6$], [i$C_3$mim][$PF_6$], [$C_6$mim][$PF_6$], [$C_4$mim][$BF_4$], [$C_2$mim][$BF_4$], [$C_2$mim][$C_2H_3O_2$] and [$C_2$mim][$C_2F_3O_2$].

Illustrative 1-alkyl-3-methyl-imidazolium ionic liquids, [Cn-mim]X[n=4 and 6, X=$Cl^-$, $Br^-$, $SCN^-$, $(PF_6)^-$, $(BF_4)^-$] and [$C_8$mim]Cl have been prepared. The dissolution of cellulose (fibrous cellulose, from Aldrich Chemical Co.) in those illustrative ionic liquids under ambient conditions with heating to 100° C., with sonication and with microwave heating, has been examined. Dissolution is enhanced by the use of microwave heating. Cellulose solutions can be prepared very quickly, which is energy efficient and provides associated economic benefits.

A preferred ionic liquid and a solution prepared from such a liquid is substantially free of water or a nitrogen-containing base. Such a liquid or solution contains about one percent or less of water or a nitrogen-containing base. Thus, when a solution is prepared, it is prepared by admixing the ionic liquid and cellulose in the absence of water or a nitrogen-containing base to form an admixture.

A range of different cations can be employed of those screened from the common sets used to prepare ionic liquids; imidazolium salts appear to be most effective, with the smallest imidazolium cation exhibiting the easiest dissolution. Alkyl-pyridinium salts free of organic base were less effective. Smaller phosphonium and ammonium quaternary salts containing shorter chain alkyl substituents are known, but have higher melting points and are often not liquid within the acceptable range for definition as ionic liquids.

The use of an imidazolium chloride ionic liquid as solvent for cellulose provides a significant improvement over the previously-reported solubility of cellulose in the organic salt/base N-benzylpyridinium chloride/pyridine as discussed in U.S. Pat. No. 1,943,176, and in which the maximum solubility was 5 weight percent. Indeed, additional nitrogen-containing bases as were used in that patent are not required to obtain good solubility of cellulose in the ionic liquids.

Other ionic liquids include, but are not limited to, those ionic liquids disclosed in U.S. Pat. No. 6,824,599 and U.S. Pat. No. 6,808,557, the contents of each being hereby incorporated by reference.

Additives

Any conventional additive used in polymeric formulations can be incorporated into the nanomaterials of the present invention. If these additives are incorporated during the dissolution stage of the resin substrate materials and magnetic nanoparticulate substances, it is important that such additives do not interfere with the solute-solvent and solvent-solvent interactions. Examples of conventional additives include, but are not limited, plasticizers, fillers, colorants, UV-screening agents and antioxidants. Other additives include, but are not limited to those additives disclosed in U.S. Pat. No. 6,808,557.

The inventive process is further illustrated, using the following examples, but there is no intention that the invention be restricted thereto.

EXAMPLES

As an example of the operation of the present process, the nanoparticles are suspended in a mixture of the ionic liquid and the resin substrate material, preferably dissolved cellulose. The nanoparticles are present in a range of from 2.0 to 30.0 wt % relative to ionic liquid. The resin substrate material is present in an amount of from 2 to 20 wt % relative to ionic liquid. The obtained suspension is placed in an ultrasonic bath for 1 h, then degassed in a vacuum oven, preferably at 50° C. for approximately 10 min. A 150 Gauss magnetic field is then supplied using a single magnetic field source or a combination of magnetic field sources. The resin substrate material is reconstituted with the nanoparticles captured therein in an aligned configuration, by contacting with water to remove the ionic liquid while causing the resin substrate material to reconstitute in solid form with the nanoparticles encapsulated therein, all while maintaining the presence of the magnetic field. The contacting with water can be performed by a variety of methods, such as extrusion of the mixture in the form of a sheet into water, casting the mixture into a sheet and washing the sheet with water to remove the ionic liquid, In preferred method for performing the present invention, the mixture is manually homogenized (to ensure complete mutual dispersion) and then cast as a film (approximately 1 mm thickness) on a glass plate using coating rods (R&D Specialties, Weber, N.Y.). The films are reconstituted and the IL solvent is leached from the films with deionized (DI) $H_2O$. Following complete reconstitution, the film is placed in a bath and immersed in DI $H_2O$ for at least 24 h to leach residual IL (such as a more preferred IL, [$C_4$mim]Cl) from the film.

The invention claimed is:

1. A method for making a nanomaterial, comprising:
   dissolving and/or suspending a combination of (a) one or more resin substrate materials and (b) one or more magnetic nanoparticulate substances, in a medium comprising one or more ionic liquids, to provide a mixture; and
   recovering a solid nanomaterial comprising the one or more resin substrate materials having the one or more magnetic nanoparticulate substances distributed therein, by combining the mixture with a non-solvent;
   wherein during the recovery step, an electromagnetic field is applied to the mixture to align the one or more nanoparticulate substances within the one or more resin substrate materials.

2. The method of claim 1, wherein the electromagnetic field is a uniaxial electromagnetic field.

3. The method of claim 1, wherein the electromagnetic field is a biaxial electromagnetic field.

4. The method of claim 1, wherein the electromagnetic field is a triaxial electromagnetic field.

5. The method of claim 1, wherein the one or more resin substrate materials are at least one member selected from the group consisting of polysaccharides, polyesters, polyamides, polyurethanes, polysiloxanes, phenol polymers, polysulfides, polyacetals, polyolefins, acrylates, methacrylates, polyimideamides, polybenzoimide, aramides, polyimides, and dienes.

6. The method of claim 5, wherein the one or more resin substrate materials is cellulose or a derivative thereof.

7. The method of claim 1, wherein the medium comprises one or more ionic liquids having a cation portion of the one or more ionic liquids formed from at least one member selected from the group consisting of imidazoles, pyrazoles, thiazoles, isothiazoles, azathiozoles, oxothiazoles, oxazines, oxazolines, oxazaboroles, dithiozoles, triazoles, selenozoles, oxaphospholes, pyrroles, boroles, furans, thiophens, phospholes, pentazoles, indoles, indolines, oxazoles, isoxazoles, isotriazoles, tetrazoles, benzofurans, dibenzofurans, benzothiophens, dibenzothiophens, thiadiazoles, pyridines, pyrimidines, pyrazines, pyridazines, piperazines, piperidines, morpholones, pyrans, annolines, phthalazines, quinazolines and quinoxalines, quinolines, pyrrolidines, isoquinolines, and combinations thereof.

8. The method of claim 1, wherein the medium comprises one or more ionic liquids having an anionic portion of the one or more ionic liquids formed from at least one member selected from the group consisting of halogens, $BX_4^-$, $PF_6^-$, $AsF_6^-$, $SbF_6^-$, $NO_2^-$, $NO_3^-$, $SO_4^{2-}$, $BR_4^-$, carboranes, substituted carboranes, metallocarboranes, substituted metallocarboranes, phosphates, phosphites, polyoxometallates, carboxylates, substituted carboxylates, triflates and noncoordinating anions;
   wherein R is at least one member selected from the group consisting of hydrogen, alkyl, substituted alkyl, cycloalkyl, substituted cycloalkyl, heteroalkyl, heterocycloalkyl, substituted heterocycloalkyl, aryl, substituted aryl, heteroaryl, substituted heteroaryl, alkoxy, aryloxy, acyl, silyl, boryl, phosphino, amino, thio, seleno, and combinations thereof.

9. The method of claim 1, wherein the medium comprises one or more ionic liquids selected from the group consisting of 1-$C_2$ alkyl-3-methyl-imidazolium chloride, 1-$C_3$ alkyl-3-methyl-imidazolium chloride, 1-$C_4$ alkyl-3-methyl-imidazolium chloride, 1-$C_6$ alkyl-3-methyl-imidazolium chloride, 1-$C_8$ alkyl-3-methyl-imidazolium chloride, 1-$C_2$ alkyl-3-methyl-imidazolium iodide, 1-$C_4$ alkyl-3-methyl-imidazolium iodide, 1-$C_4$ alkyl-3-methyl-imidazolium hexafluorophosphate, 1-$C_2$ alkyl-3-methyl-imidazolium hexafluorophosphate, 1-$C_3$ alkyl-3-methyl-imidazolium hexafluorophosphate, 1-iso-$C_3$ alkyl-3-methyl-imidazolium hexafluorophosphate, 1-$C_6$ alkyl-3-methyl-imidazolium hexafluorophosphate, 1-$C_4$ alkyl-3-methyl-imidazolium tetrafluoroborate, 1-$C_2$ alkyl-3-methyl-imidazolium tetrafluoroborate, 1-$C_2$ alkyl-3-methyl-imidazolium acetate and 1-$C_2$ alkyl-3-methyl-imidazolium trifluoroacetate.

10. The method of claim 1, wherein the non-solvent is a member selected from the group consisting of water and alcohols.

11. The method of claim 1, wherein the one or more magnetic nanoparticulate substances are at least one member selected from the group consisting of iron, cobalt, nickel, oxides thereof, alloys thereof and mixtures thereof.

* * * * *